United States Patent
Ebrahim et al.

(10) Patent No.: US 10,258,198 B2
(45) Date of Patent: Apr. 16, 2019

(54) DUAL FUNCTION GARLIC PRESS

(71) Applicants: Ali Abdulhusein Ebrahim, North Point (HK); Philip A. Spencer, Queen's Road East (HK)

(72) Inventors: Ali Abdulhusein Ebrahim, North Point (HK); Philip A. Spencer, Queen's Road East (HK)

(73) Assignee: Masterful Limited, North Point (HK)

( * ) Notice: Subject to any disclaimer, the term of this patent is extended or adjusted under 35 U.S.C. 154(b) by 264 days.

(21) Appl. No.: 15/461,497

(22) Filed: Mar. 17, 2017

(65) Prior Publication Data

US 2018/0220848 A1 Aug. 9, 2018

(30) Foreign Application Priority Data

Feb. 3, 2017 (CN) .......................... 2017 1 0063181

(51) Int. Cl.

| *A47J 19/02* | (2006.01) |
| *B30B 9/02* | (2006.01) |
| *A47J 43/04* | (2006.01) |
| *B30B 9/04* | (2006.01) |
| *B30B 9/06* | (2006.01) |
| *A47J 19/00* | (2006.01) |
| *A47J 19/06* | (2006.01) |

(52) U.S. Cl.
CPC ............ *A47J 43/04* (2013.01); *A47J 19/005* (2013.01); *A47J 19/02* (2013.01); *A47J 19/06* (2013.01); *B30B 9/02* (2013.01); *B30B 9/04* (2013.01); *B30B 9/06* (2013.01)

(58) Field of Classification Search
CPC ........ A47J 19/02; A47J 19/022; A47J 19/023; A47J 19/06; A47J 19/005; A47J 43/04; A47J 43/286; A47J 44/00; A47J 2043/04481; A47J 2043/0449; B30B 9/02; B30B 9/04; B30B 9/06; B30B 15/08; A23N 1/00; A23N 1/02; A23L 2/04
USPC .......... 100/110, 112, 213, 234, 243; 99/495, 99/505, 506, 508, 501, 503, 513, 565
See application file for complete search history.

(56) References Cited

U.S. PATENT DOCUMENTS

| 572,936 A | * | 12/1896 | Waters et al. | ......... A47J 19/022 100/125 |
| 5,101,720 A | * | 4/1992 | Bianchi | .................... A47J 19/06 100/112 |
| 8,534,190 B2 | * | 9/2013 | Ericsson | .................. A47J 19/06 100/112 |
| 2002/0046658 A1 | * | 4/2002 | Kokkinos | ............... A47J 19/06 99/349 |

* cited by examiner

*Primary Examiner* — Jimmy T Nguyen

(57) ABSTRACT

A dual function garlic press includes an upper handle having a plunger, a lower handle having a receiving chamber and a cutter grid. The cutter grid is pivotally connected to the first side of plunger. The upper handle is rotatable in relation to the lower handle about a vertical axis between a first position where the first side of the plunger faces towards the receiving chamber when the upper handle and the lower handle are at the close position, and a second position where the second side of the plunger is juxtaposed to the bottom of the receiving chamber when the upper handle and the lower handle are at the close position to crush the item in the receiving chamber.

9 Claims, 5 Drawing Sheets

US 10,258,198 B2

DUAL FUNCTION GARLIC PRESS

BACKGROUND OF THE INVENTION

The present invention relates to a garlic press and more particularly pertains to a dual function garlic press which is capable of first dicing and then crushing food items such as garlic cloves and the like.

Conventional garlic presses operate by first placing food item such as a garlic clove in the receiving chamber, and then closing the upper handle and the lower handle to cause the plunger to crush the garlic clove in the receiving chamber and the crushed garlic is extruded from the holes in the receiving chamber. After crushing the garlic clove, there is always a film of garlic or garlic residues left in the receiving chamber which is normally discarded.

BRIEF SUMMARY OF THE INVENTION

In view of the aforesaid disadvantages now present in the prior art, the object of the present invention is to provide a dual function garlic press which leaves no unusable residue as well as making the product easier to clean. This is accomplished by providing a garlic press which is capable of first dicing and then crushing food items such as garlic cloves and the like, sequentially without the need for any secondary handling, which is found to reduce the amount of garlic film or garlic residues after crushing. Having initially been diced the smaller amount of residues breaks up into usable garlic pieces once removed from the chamber ahead of cleaning the product. Besides, it is found that crushing diced food items instead of unprocessed food items increases output and efficiency. Furthermore, depending on the user's needs, the dicing and crushing functions could also be performed independently.

To attain this, the dual function garlic press of the present invention comprises an upper handle having a plunger at a first end thereof, with the plunger having a first side with a plurality of protrusions forming a pattern and a second side;

a lower handle having a receiving chamber at a first end thereof, with the receiving chamber having a bottom with a plurality of holes forming a pattern;

the upper handle and the lower handle are pivotally connected with each other at the first ends thereof about a horizontal axis and movable between a close position and an open position;

a cutter grid is pivotally connected to the first side of plunger for dicing an item interposed between the cutter grid and the first side of the plunger into the receiving chamber by advance of the plurality of protrusions into the cutter grid when the cutter grid is positioned and supported on top of the receiving chamber;

the upper handle is rotatable in relation to the lower handle about a vertical axis between a first position where the first side of the plunger faces towards the receiving chamber when the upper handle and the lower handle are at the close position, and a second position where the second side of the plunger is juxtaposed to the bottom of the receiving chamber when the upper handle and the lower handle are at the close position to crush the item in the receiving chamber.

The second side of the plunger is disposed with a plurality of blunt pins forming a pattern which corresponds to the pattern of the plurality of holes formed at the bottom of the receiving chamber, thereby facilitating crushing of the item in the receiving chamber.

The vertical axis intersects the horizontal axis.

A hinge member which serves as the vertical axis comprising a lower rod portion and an upper portion having a horizontal through hole is provided; the plunger has a pair of plunger apertures coaxially formed along the horizontal axis at a front end thereof; the cutter grid has a pair of cutter grid apertures coaxially formed along the horizontal axis at a front end thereof; the receiving chamber has a receiving chamber aperture axially formed along the vertical axis at a front end thereof; a pin which serves as the horizontal axis is placed through the cutter grid apertures, the plunger apertures and the through hole of the hinge member to pivotally connect the plunger, the cutter grid and the receiving chamber about the horizontal axis; the lower rod portion of the hinge member is rotationally received in the receiving chamber aperture to rotationally connect the pivotally connected plunger and cutter grid to the receiving chamber along the vertical axis.

The upper portion of the hinge member has a larger cross section than the receiving chamber aperture so that the upper portion stays above the receiving chamber.

The lower rod portion of the hinge member extends downward from the middle of the upper portion.

Optionally, a cleaning tool removably engaged to the garlic press may be provided; the cleaning tool comprises a handle and a brush extended from the handle.

The lower handle has an interior chamber which is provided with two ribs; the handle of the cleaning tool is provided with two recesses; the two ribs is friction fit within the two recesses respectively.

The cutter grid is provided with an extension which slightly extends outside a rear end of the receiving chamber when the cutter grid is positioned and supported on top of the receiving chamber.

DETAILED DESCRIPTION OF THE INVENTION

The present invention is further described in detail with the following embodiment and the accompanying drawings.

Figure 1:
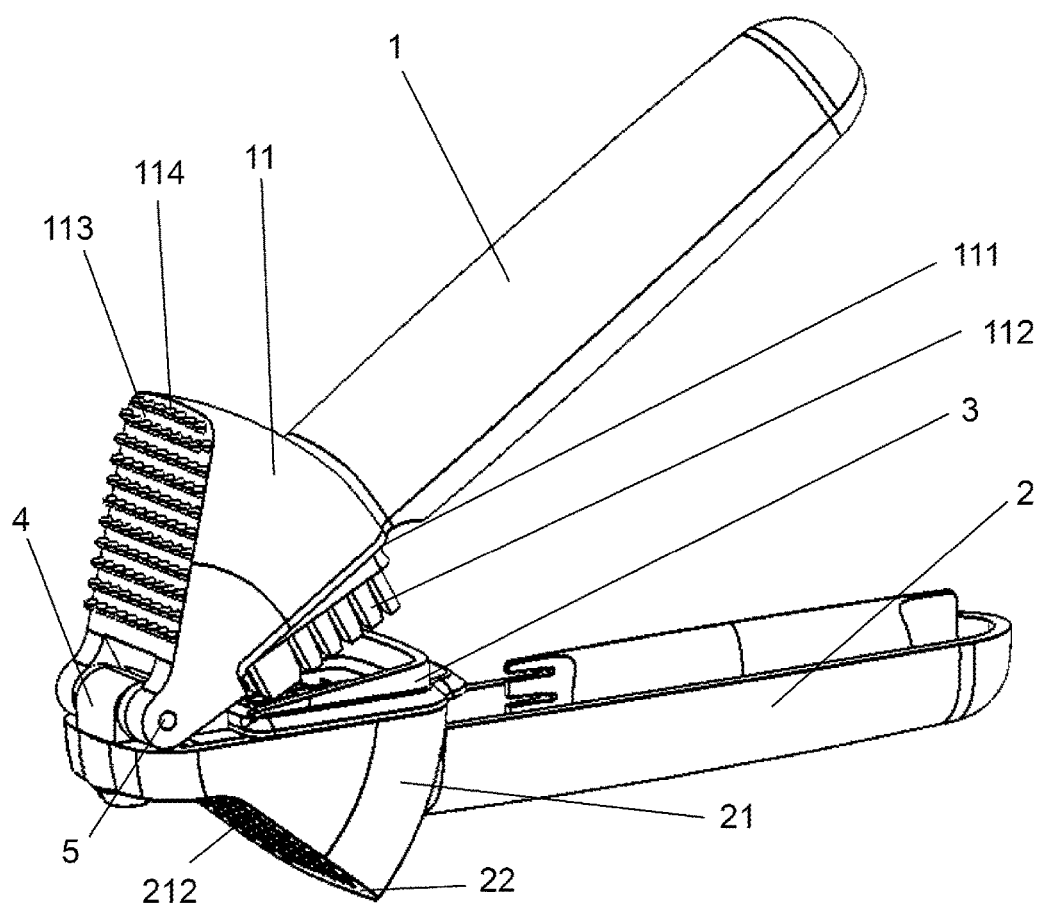
FIG. 1 is a perspective view of the garlic press of the preferred embodiment of the present invention.
Figure 2:
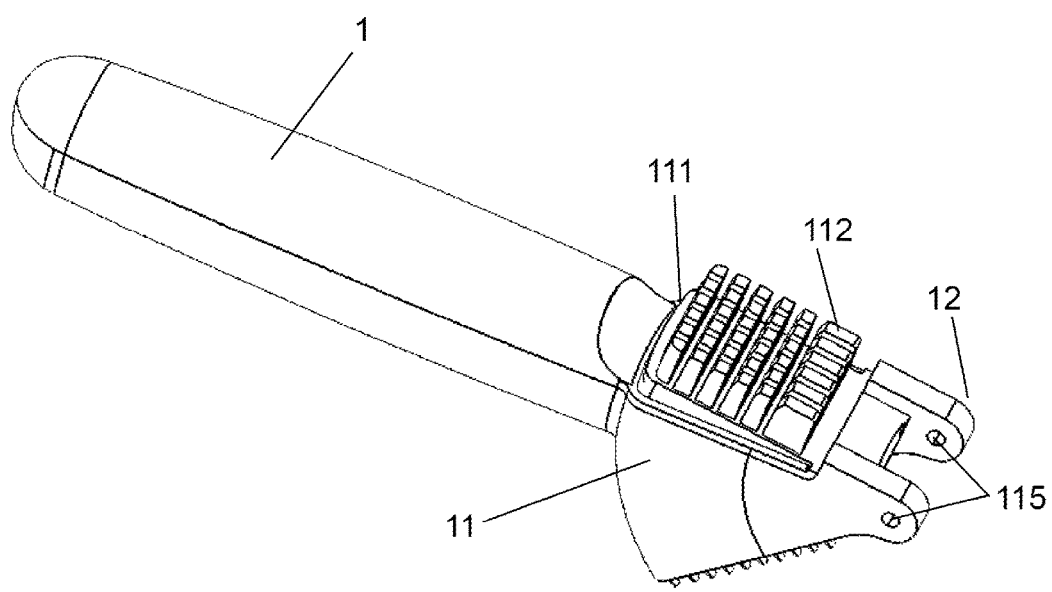
FIG. 2 is a perspective view of the upper handle of the preferred embodiment as shown in FIG. 1.
Figure 3:
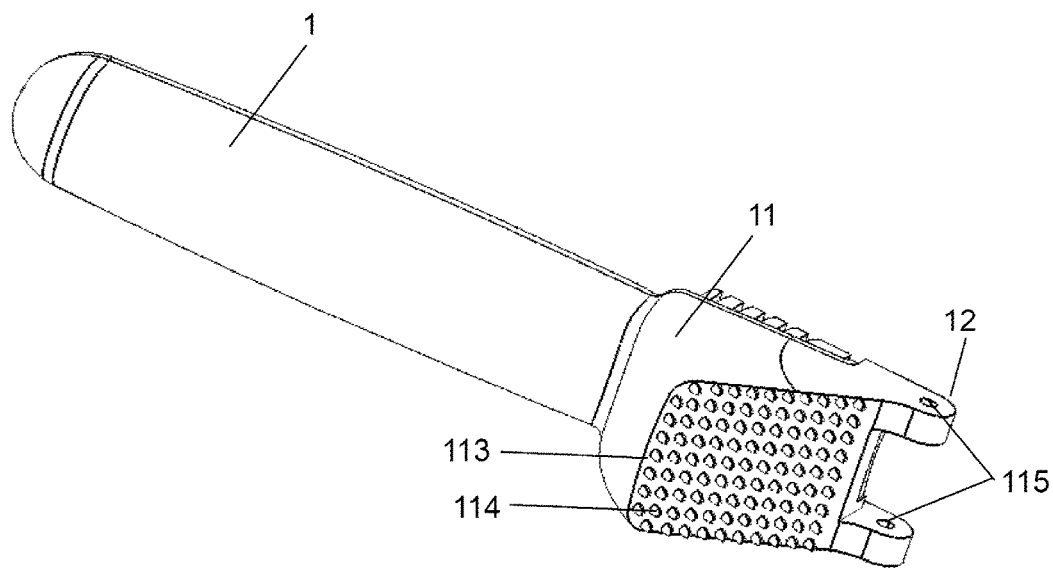
FIG. 3 is another perspective view of the upper handle of the preferred embodiment as shown in FIG. 1.
Figure 4:
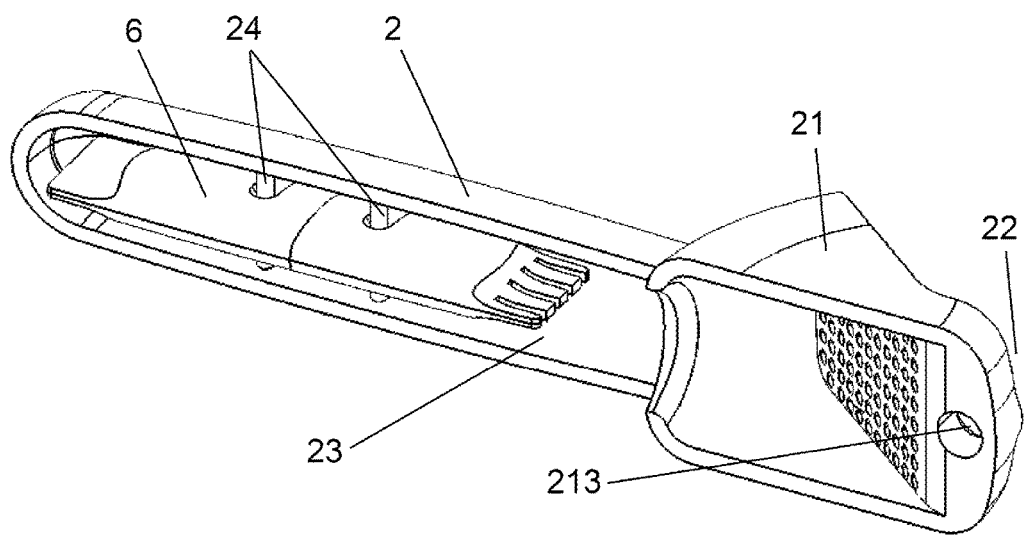
FIG. 4 is a perspective view of the lower handle of the preferred embodiment as shown in FIG. 1.
Figure 5:
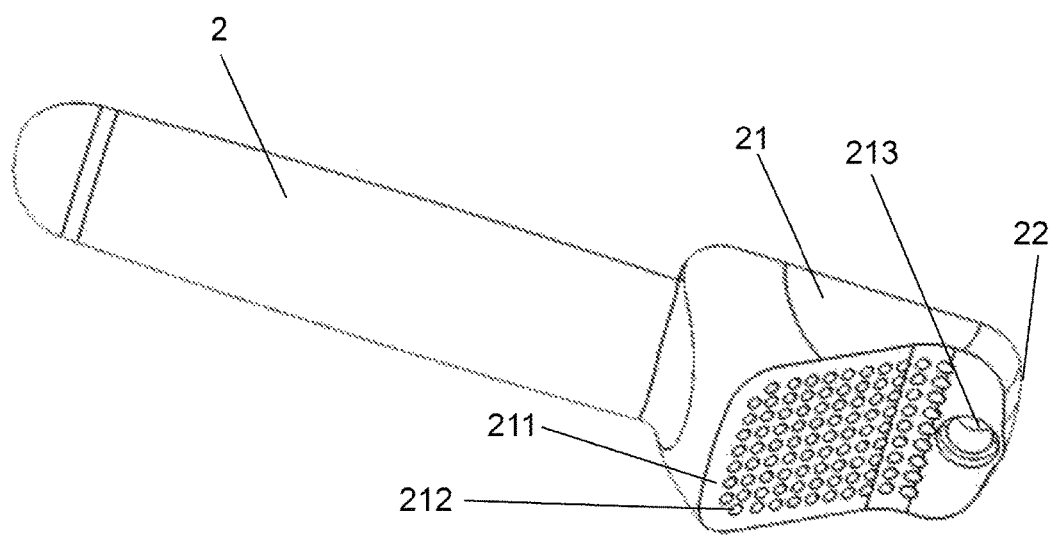
FIG. 5 is another perspective view of the lower handle of the preferred embodiment as shown in FIG. 1.
Figure 6:
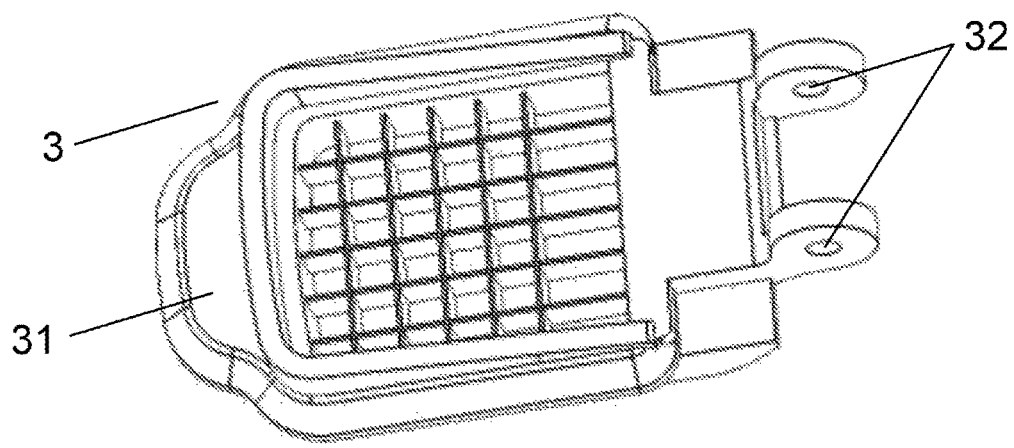
FIG. 6 is a perspective view of the cutter grid of the preferred embodiment as shown in FIG. 1.
Figure 7:
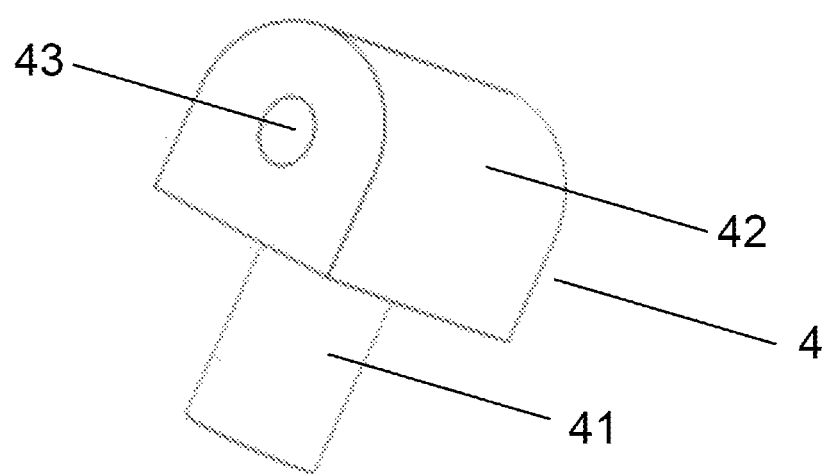
FIG. 7 is a perspective view of the hinge member of the preferred embodiment as shown in FIG. 1.
Figure 8:
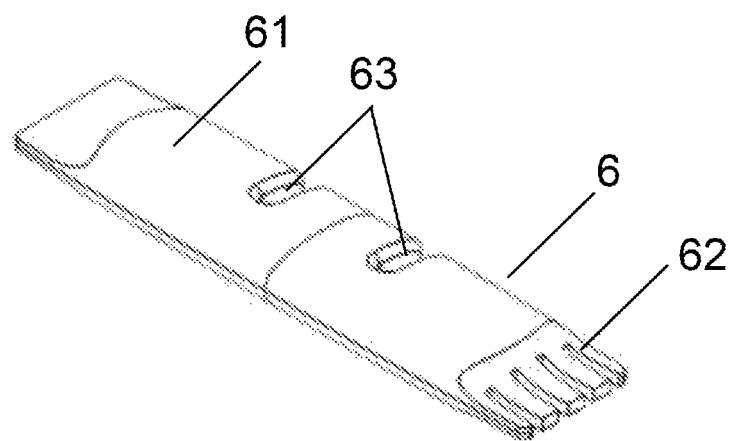
FIG. 8 is a perspective view of the cleaning tool of the preferred embodiment as shown in FIG. 1.

As illustrated in FIGS. 1-8, an exemplary embodiment of the present invention comprises an upper handle 1, a lower handle 2, a cutter grid 3 and a hinge member 4.

The upper handle 1 has a plunger 11 at a first end 12 thereof. The plunger 11 has a first side 111 having a plurality of protrusions 112 forming a pattern and a second side 113. The lower handle 2 has a receiving chamber 21 at a first end 22 thereof. The receiving chamber 21 has a bottom 211 with a plurality of holes 212 forming a pattern. The second side 113 of the plunger 11 is disposed with a plurality of blunt pins 114 forming a pattern which corresponds to the pattern of the plurality of holes 212 formed at the bottom 211 of the receiving chamber 21, thereby facilitating crushing of the item in the receiving chamber 21.

The upper handle 1 and the lower handle 2 are pivotally connected with each other at the first ends 12, 22 thereof about a horizontal axis and movable between a close position and an open position.

The cutter grid 3 is pivotally connected to the first side 111 of plunger 11 for dicing an item interposed between cutter grid 3 and the first side 111 of the plunger 11 into the receiving chamber 21 by advance of the plurality of protrusions 112 into the cutter grid 3 when the cutter grid 3 is positioned and supported on top of the receiving chamber 21. The cutter grid 3 is provided with an extension 31 which slightly extends outside a rear end of the receiving chamber 21 when the cutter grid 3 is positioned and supported on top of the receiving chamber 21.

The upper handle 1 is rotatable in relation to the lower handle 2 about a vertical axis. The hinge member 4 which serves as the vertical axis comprises a lower rod portion 41 and an upper portion 42 having a horizontal through hole 43. The plunger 11 has a pair of plunger apertures 115 coaxially formed along the horizontal axis at a front end thereof; the cutter grid 3 has a pair of cutter grid apertures 32 coaxially formed along the horizontal axis at a front end thereof; the receiving chamber 21 has a receiving chamber aperture 213 axially formed along the vertical axis at a front end thereof; a pin 5 which serves as the horizontal axis is placed through the cutter grid apertures 32, the plunger apertures 115 and the through hole 43 of the hinge member 4 to pivotally connect the plunger 11, the cutter grid 3 and the receiving chamber 21 about the horizontal axis. The lower rod portion 41 of the hinge member 4 is rotationally received in the receiving chamber aperture 213 to rotationally connect the pivotally connected plunger 11 and cutter grid 3 to the receiving chamber 21 along the vertical axis. In this way, the upper handle 1 is rotatable in relation to the lower handle 2 about the vertical axis between a first position where the first side 111 of the plunger 11 faces towards the receiving chamber 21 when the upper handle 1 and the lower handle 2 are at the close position, and a second position where the second side 113 of the plunger 11 is juxtaposed to the bottom 211 of the receiving chamber 21 when the upper handle 1 and the lower handle 2 are at the close position so as to crush the item in the receiving chamber 21.

The upper portion 42 of the hinge member 4 has a larger cross section than the receiving chamber aperture 213 so that the upper portion 42 stays above the receiving chamber 21. The lower rod portion 41 of the hinge member 4 extends downward from the middle of the upper portion 42, therefore the vertical axis intersects the horizontal axis.

A cleaning tool 6 removably engaged to the garlic press is optionally provided. The cleaning tool 6 comprises a handle 61 and a brush 62 extended from the handle 61. The lower handle 2 has an interior chamber 23 which is provided with two ribs 24. The handle 61 of the cleaning tool 6 is provided with two recesses 63. The two ribs 24 is friction fit within the two recesses 63 respectively.

The garlic press of the present embodiment operates as follows:

Initially, the upper handle 1 is at the second position where the second side 113 of the plunger 11 is juxtaposed to the bottom 211 of the receiving chamber 21 and the upper handle 1 and the lower handle 2 are at the close position. To use the garlic press, the user first lifts up the upper handle 1 and rotates the upper handle 1 in relation to the lower handle 2 about the vertical axis so that the upper handle 1 is at the first position. The user then pivots the cutter grid 3 from the first side 111 of the plunger 11 and flips the cutter grid 3 to the top of the receiving chamber 21. A garlic clove could then be placed on the cutter grid 3, and thereafter the upper handle 1 is pressed towards the lower handle 2, thereby advancing the plurality of protrusions 112 into the cutter grid 3 so as to dice the garlic clove interposed between the cutter grid 3 and the first side 111 of the plunger 11 into the receiving chamber 21. After the dicing is done, the user then lifts up the upper handle 1 and pivots the cutter grid 3 to the first side 111 of the plunger 11, and thereafter rotates the upper handle 1 in relation to the lower handle 2 about the vertical axis so that the upper handle 1 is at the second position. The upper handle 1 is then pressed towards the lower handle 2 so that the second side 113 of the plunger 11 is juxtaposed to the bottom 211 of the receiving chamber 21 and the plurality of blunt pins 114 passes through the plurality of holes 212 in the receiving chamber 21 so as to crush the diced garlic inside the receiving chamber 21 and extrude the crushed garlic from the plurality of holes 212 in the receiving chamber 21.

The above embodiment is a preferred embodiment of the present invention. The present invention is capable of other embodiments and is not limited by the above embodiment. Any other variation, decoration, substitution, combination or simplification, whether in substance or in principle, not deviated from the spirit of the present invention, is replacement or substitution of equivalent effect and falls within the scope of protection of the present invention.

What is claimed is:

1. A dual function garlic press comprising:
   an upper handle having a plunger at a first end thereof, with the plunger having a first side with a plurality of protrusions forming a pattern and a second side;
   a lower handle having a receiving chamber at a first end thereof, with the receiving chamber having a bottom with a plurality of holes forming a pattern;
   the upper handle and the lower handle are pivotally connected with each other at the first ends thereof about a horizontal axis and movable between a close position and an open position;
   a vertical hinge member is rotationally connected the upper handle to the lower handle at the first ends thereof along a vertical axis; and
   a cutter grid is pivotally connected to the first side of plunger for dicing an item interposed between the cutter grid and the first side of the plunger into the receiving chamber by advance of the plurality of protrusions into the cutter grid when the cutter grid is positioned and supported on top of the receiving chamber,
   wherein the upper handle is configured to rotate in relation to the lower handle about the vertical axis between a first position where the first side of the plunger faces towards the receiving chamber when the upper handle and the lower handle are at the close position, and a second position where the second side of the plunger is juxtaposed to the bottom of the receiving chamber when the upper handle and the lower handle are at the close position to crush the item in the receiving chamber.

2. The dual function garlic press as in claim 1, wherein the second side of the plunger is disposed with a plurality of blunt pins forming a pattern which corresponds to the pattern of the plurality of holes formed at the bottom of the receiving chamber.

3. The dual function garlic press as in claim 1, wherein the vertical axis intersects the horizontal axis.

4. The dual function garlic press as in claim 1, wherein the vertical hinge member which serves as the vertical axis comprising a lower rod portion and an upper portion having a horizontal through hole is provided; the plunger has a pair of plunger apertures coaxially formed along the horizontal axis at a front end thereof; the cutter grid has a pair of cutter grid apertures coaxially formed along the horizontal axis at a front end thereof; the receiving chamber has a receiving chamber aperture axially formed along the vertical axis at a front end thereof; a pin which serves as the horizontal axis is placed through the cutter grid apertures, the plunger apertures and the through hole of the hinge member to pivotally connect the plunger, the cutter grid and the receiving chamber about the horizontal axis; the lower rod portion of the hinge member is rotationally received in the receiving chamber aperture to rotationally connect the pivotally connected plunger and cutter grid to the receiving chamber along the vertical axis.

5. The dual function garlic press as in claim 4, wherein the upper portion of the hinge member has a larger cross section than the receiving chamber aperture so that the upper portion stays above the receiving chamber.

6. The dual function garlic press as in claim 4, wherein the lower rod portion of the hinge member extends downward from a middle of the upper portion.

7. The dual function garlic press as in claim 1, wherein a cleaning tool removably engaged to the lower handle is provided; the cleaning tool comprises a handle and a brush extended from the handle.

8. The dual function garlic press as in claim 7, wherein the lower handle has an interior chamber which is provided with two ribs; the handle of the cleaning tool is provided with two recesses; the two ribs is friction fit within the two recesses respectively.

9. The dual function garlic press as in claim 1, wherein the cutter grid is provided with an extension which slightly extends outside a rear end of the receiving chamber when the cutter grid is positioned and supported on top of the receiving chamber.

\* \* \* \* \*